(12) United States Patent
Ikeda et al.

(10) Patent No.: US 7,649,601 B2
(45) Date of Patent: Jan. 19, 2010

(54) LIQUID CRYSTAL DISPLAY HAVING PROTRUSION-LIKE STRUCTURES BETWEEN PAIR OF SUBSTRATES

(75) Inventors: Masahiro Ikeda, Kawasaki (JP);
Manabu Sawasaki, Kawasaki (JP);
Takashi Takagi, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 0 days.

(21) Appl. No.: 10/941,331

(22) Filed: Sep. 15, 2004

(65) Prior Publication Data
US 2005/0237459 A1 Oct. 27, 2005

(30) Foreign Application Priority Data
Apr. 23, 2004 (JP) .............................. 2004-128604

(51) Int. Cl.
*G02F 1/1339* (2006.01)
*G02F 1/1337* (2006.01)
(52) U.S. Cl. ................... 349/129; 349/155; 349/156
(58) Field of Classification Search ............ 349/129, 349/155–157
See application file for complete search history.

(56) References Cited

U.S. PATENT DOCUMENTS

| | | | |
|---|---|---|---|
| 6,266,122 B1 * | 7/2001 | Kishimoto et al. | 349/156 |
| 6,356,335 B1 | 3/2002 | Kim et al. | 349/156 |
| 6,396,559 B1 * | 5/2002 | Kishimoto et al. | 349/156 |
| 6,667,077 B1 * | 12/2003 | Oaku et al. | 428/1.1 |
| 2001/0026347 A1 | 10/2001 | Sawasaki et al. | 349/156 |
| 2001/0055088 A1 * | 12/2001 | Kume et al. | 349/156 |
| 2002/0039166 A1 * | 4/2002 | Song | 349/156 |
| 2004/0114087 A1 * | 6/2004 | Cho et al. | 349/155 |
| 2004/0141142 A1 * | 7/2004 | Choi et al. | 349/155 |

FOREIGN PATENT DOCUMENTS

| | | |
|---|---|---|
| JP | 06-273735 | 9/1994 |
| JP | 2001-201750 | 7/2001 |
| JP | 2001-337332 | 12/2001 |
| JP | 2002-214622 | 7/2002 |
| JP | 2002-214624 | 7/2002 |
| JP | 2002-287158 | 10/2002 |
| JP | 2002-341354 | 11/2002 |
| JP | 2003-156750 | 5/2003 |
| JP | 2003-215602 | 7/2003 |
| KR | 2002-0027710 | 4/2002 |

* cited by examiner

*Primary Examiner*—David Nelms
*Assistant Examiner*—David Y Chung
(74) *Attorney, Agent, or Firm*—Green, Burns & Crain, Ltd.

(57) ABSTRACT

The invention relates to liquid crystal displays used in display sections of electronic apparatus and provides a liquid crystal display in which high anti-pressure characteristics can be achieved with a high aperture ratio maintained. A configuration is provided, which includes a pair of substrates provided opposite to each other, a liquid crystal sealed between the substrates, a plurality of pixel regions provided on the substrates, and protrusion-like structures provided in the pixel regions for regulating the alignment of the liquid crystal and maintaining a cell thickness between the substrates.

11 Claims, 9 Drawing Sheets

PRIOR ART

LIQUID CRYSTAL DISPLAY HAVING PROTRUSION-LIKE STRUCTURES BETWEEN PAIR OF SUBSTRATES

BACKGROUND OF THE INVENTION

1. Field of the Invention

The present invention relates to a liquid crystal display used in a display section of an electronic apparatus.

2. Description of the Related Art

A liquid crystal display has a pair of substrates provided opposite to each other and a liquid crystal layer sandwiched between the substrates. In general, transparent electrodes are formed on each of surfaces of the pair of substrate opposite to each other. The liquid crystal display is enabled for display by applying a voltage between the transparent electrodes to drive the liquid crystal and to thereby control the transmittance of light at each pixel.

Recently, there are increasing demands and diversifying requirements for liquid crystal displays. In particular, improvement in viewing angle characteristics and display quality is strongly demanded. Multi-domain vertical alignment (MVA) type liquid crystal displays are regarded promising as a technique for achieving improved viewing angle characteristics and display quality.

In a general active matrix type liquid crystal display, the cell thickness between the substrates is controlled by spherical spacers made of plastic. Spherical spacers are dispersed on one of the substrates at a spacer dispersing step before the substrates are attached. Thereafter, the substrates are attached, and a liquid crystal is injected. Further, pressurization is carried out such that the cell thickness will be maintained at a value close to the diameter of the spherical spacers. However, a liquid crystal display utilizing spherical spacers has a problem in that it is likely to have variation of the cell thickness attributable to variation of the dispersion density of the spherical spacers and leakage of light attributable to damage on alignment films that can occur when the spherical spacers move.

Recently, as a technique for simplifying manufacturing processes through a reduction of liquid crystal injection time, the one drop filling (ODF) method has been put in use, in which two substrates are attached after dropping a liquid crystal on one of the substrates. When a liquid crystal is injected using the ODF method, it is difficult to distribute spherical spacers uniformly within the plane of a panel because dispersed spherical spacers move when a liquid crystal is dropped. For this reason, spherical spacers cannot be used in a liquid crystal display fabricated using the ODF method.

Figure 9:
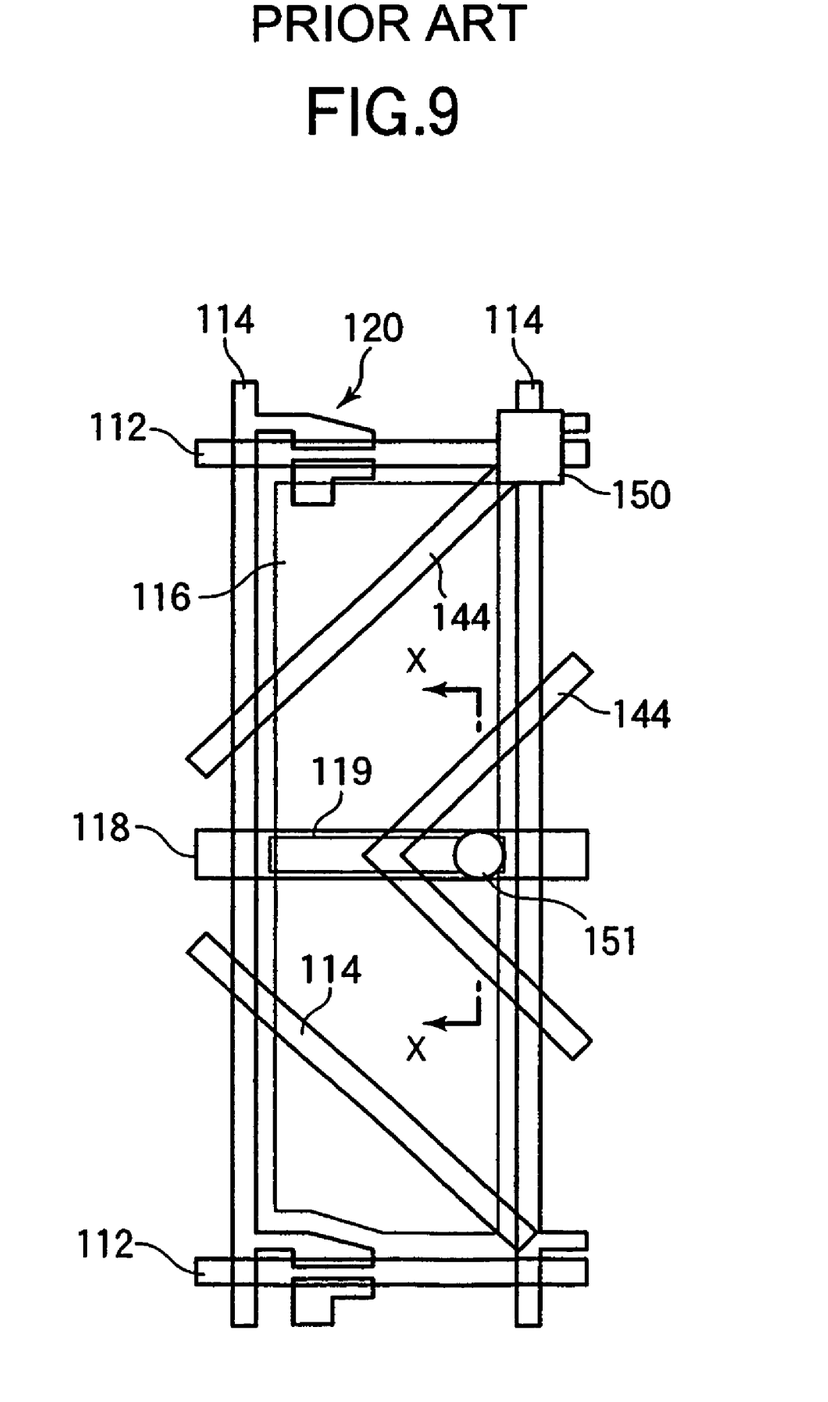
FIG. 9 shows a configuration of an MVA type liquid crystal display according to the related art.
Figure 10:
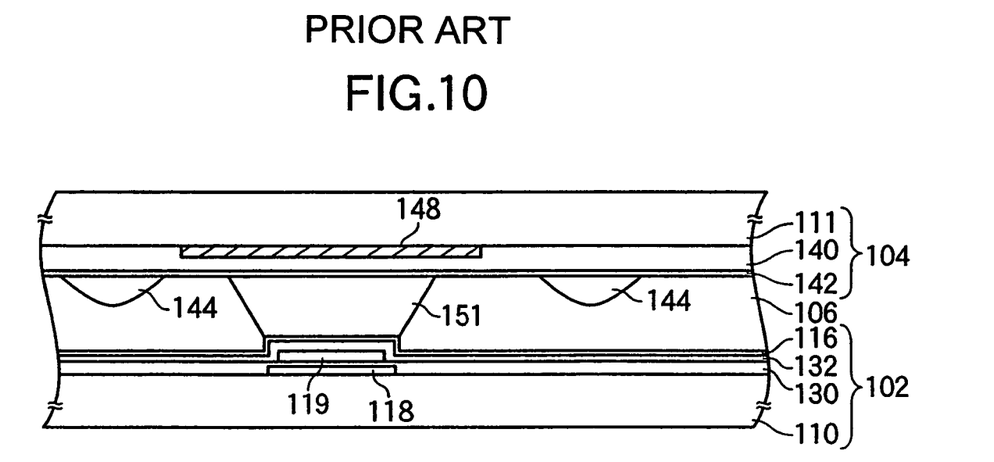
FIG. 10 shows a sectional view showing the configuration of the MVA type liquid crystal display according to the related art.

Under such circumstances, pillar spacers are used in liquid crystal displays fabricated using the ODF method in particular, the pillar spacers being securely formed on one of substrates using a photolithographic process and contacting the other substrate to maintain a cell thickness after the substrates are attached. FIG. 9 shows a configuration of an MVA type liquid crystal display according to the related art having pillar spacers, and FIG. 10 shows a sectional configuration taken along the line X-X in FIG. 9. As shown in FIGS. 9 and 10, the liquid crystal display has a thin film transistor (TFT) substrate 102 and an opposite substrate 104 which are provided opposite to each other and a liquid crystal 106 sealed between the substrates 102 and 104. The TFT substrate 102 has a plurality of gate bus lines 112 extending in the horizontal direction in FIG. 9 on a glass substrate 110. An insulation film 130 is formed on the gate bus lines 112. A plurality of drain bus lines 114 extending in the vertical direction in FIG. 9 are formed such that they intersect the gate bus lines 112 with the insulation film 130 interposed between them. An insulation film 132 is formed on the drain bus lines 114.

A TFT 120 is formed in the vicinity of each of intersections between the gate bus lines 112 and the drain bus lines 114. Transparent pixel electrodes 116 are formed on the insulation film 132 in pixel regions which are surrounded by the gate bus lines 112 and the drain bus lines 114. Storage capacitor bus lines 118 extending in parallel with the gate bus lines 112 are formed such that they traverse the respective pixel regions substantially in the middle thereof. A storage capacitor electrode (intermediate electrode) 119 is formed in each pixel region above the storage capacitor bus line 118 with the insulation film 130 interposed between them.

The opposite substrate 104 has a shielding film (BM film) 148 (not shown in FIG. 9) provided on a glass substrate 111 for shielding light-shield regions between adjoining pixel regions and regions (light-shield portions) above the storage capacitor bus lines 118 (storage capacitor electrodes 119) in the pixel regions. Color filter (CF) resin layers 140 are formed in the pixel regions on the glass substrate 111. A common electrode 142 is formed throughout the substrate over the CF resin layers 140. Linear protrusions 144 extending obliquely relative to edges of the pixel regions are formed on the common electrode 142 as alignment regulating structures for regulating the alignment of the liquid crystal 106. Pillar spacers 150 are formed in the light-shield regions on the common electrode 142, one spacer 150 being provided for a few pixels or several tens pixels. The pillar spacers 150 are provided in positions opposite to the intersections between the gate bus lines 112 and the drain bus lines 114. Pillar spacers 151 are formed in the light-shield portions in the pixel regions, one spacer 151 being provided for a few pixels or several tens pixels. The pillar spacers 151 are provided in positions opposite to the storage capacitor electrodes 119.

Figure 11:
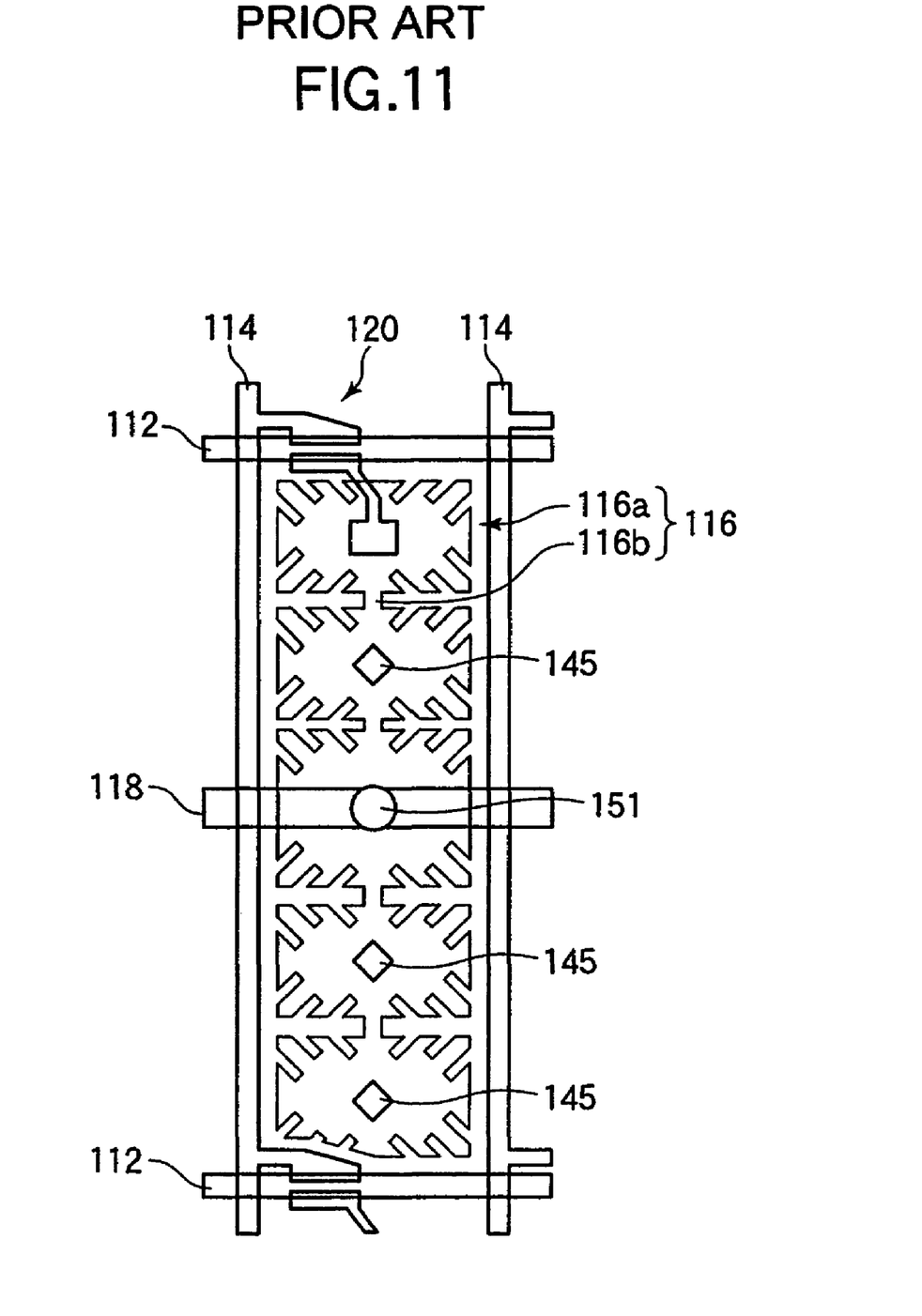
FIG. 11 shows another configuration of an MVA type liquid crystal display according to the related art.

FIG. 11 shows another configuration of an MVA type liquid crystal display according to the related art. As shown in FIG. 11, a pixel electrode 116 formed in a pixel region has a plurality of electrode units 116a having a comb-tooth-shaped peripheral section for regulating the alignment of a liquid crystal 106 and connection electrodes 116b for electrically connecting the electrode units 116a. Pillar spacers 151 are formed in light-shield portions in pixel regions in a disposition density of one pixel per a few pixels or several tens pixels. The pillar spacers 151 are provided in positions opposite to the storage capacitor bus lines 118. Point-like protrusions 145 which are alignment regulating structures are formed on an opposite substrate 104 in positions corresponding to the centers of some of the electrode units 116a.

Leakage of light and the like can occur around the pillar spacers 150 and 151 because abnormalities can occur in the alignment of the liquid crystal 106 in such regions in general. Therefore, the pillar spacers 150 and 151 are provided in light-shield regions or the light-shield portion in the pixel regions such that display failures attributable to leakage of light will not be visually perceived.

The pillar spacers 150 and 151 are provided in a predetermined pattern in the plane of a substrate. A hard liquid crystal display panel having high anti-pressure characteristics can be obtained by increasing the area or number of contacts between the pillar spacers 150 and 151 and the substrate to increase the disposition density of the pillar spacers 150 and 151.

An effective way to provide a liquid crystal display with high luminance and less power consumption is to improve utilization of light by increasing the aperture ratio of pixels. In order to improve the aperture ratio of pixels, it is necessary to increase the area of apertures at pixel regions relatively by reducing the area of light-shield regions and light-shield portions of the pixel regions. However, a reduction in the area of the light-shield regions and the light-shield portions of the pixel regions puts a limitation on the size and position of the pillar spacers 150 and 151. Thus, it is difficult to increase the disposition density of the pillar spacers 150 and 151 by increasing the number of the pillar spacers 150 and 151. A problem therefore arises in that it is difficult to provide a liquid crystal display having a high aperture ratio with high anti-pressure characteristics.

In a liquid crystal display fabricated using the ODF method, panel defects associated with liquid crystal injection such as bubbles and variation of the picture frame can occur when there is only a slight change in the amount of liquid crystal dispensed. The generation of such panel defects is attributable to variation of the height of the pillar spacers 150 and 151, thermal contraction of the liquid crystal 106, and the characteristics of compressive displacement of the pillar spacers 150 and 151. In order to increase the margin of the amount of liquid crystal dispensed, it is basically required to use a flexible liquid crystal display panel whose cell thickness can flexibly follow a change in the amount of liquid crystal dispensed in a region under a light load. A flexible liquid crystal display panel can be provided by disposing the pillar spacers 150 and 151 in a low disposition density. However, a simple reduction of the disposition density of the pillar spacers 150 and 151 reduces the anti-pressure characteristics of the liquid crystal display panel, and variation of the cell thickness can be more easily caused by local pressurization from the outside such as a press on the display surface. As thus described, in a liquid crystal display fabricated using the ODF method, the margin of the amount of liquid crystal dispensed and the anti-pressure characteristics of the display are a trade-off in general.

As a technique which makes it possible to achieve both of a wide margin of the amount of liquid crystal dispensed and high anti-pressure characteristics, there is a liquid crystal display in which pillar spacers having a great height are provided in a low disposition density and pillar spacers having a smaller height are provided in a higher disposal density (see Patent Documents 1 (JP-A-2001-201750) and 2 (JP-A-2003-156750)). In this liquid crystal display, the cell thickness is normally maintained by the pillar spacers having a greater height disposed in a lower density, and the cell thickness is maintained by the pillar spacers having a smaller height disposed in a higher density when a pressure is applied from the outside. Patent Document 1 discloses a method in which plural types of pillar spacers having different heights are formed on the same substrate. Patent Document 2 discloses a method in which pillar spacers of the same height are disposed in different positions with respect to a pixel and in which the pillar spacers are substantially formed as spacers having different heights utilizing steps formed by the thickness of metal wirings on a TFT substrate provided opposite to the spacers.

However, in a liquid crystal display having a high aperture ratio, since there are limitations on the size and position of pillar spacers as already described, it is difficult to provide pillar spacers having different heights in desired disposal densities as described above. Therefore, a liquid crystal display having a high aperture ratio fabricated using the ODF method has a problem in that it is difficult to achieve a wide margin of the amount of liquid crystal dispensed and high anti-pressure characteristics.

SUMMARY OF THE INVENTION

It is an object of the invention to provide a liquid crystal display which can be provided with high anti-pressure characteristics with a high aperture ratio maintained. It is another object of the invention to provide a liquid crystal display for which a wide margin of the amount of liquid crystal dispensed can be achieved in fabricating the display using the one drop filling method.

The above-described object is achieved by a liquid crystal display characterized in that it has a pair of substrates provided opposite to each other, a liquid crystal sealed between the pair of substrates, a plurality of pixel regions provided on the substrates, and protrusion-like structures provided in the pixel regions to regulate the alignment of the liquid crystal and to maintain a cell thickness between the pair of substrates.

The invention makes it possible to provide a liquid crystal display which has high anti-pressure characteristics while maintaining a high aperture ratio. The invention also makes it possible to provide a liquid crystal display for which a wide margin of the amount of liquid crystal dispensed can be achieved in fabricating the display using the one drop filling method.

DESCRIPTION OF THE PREFERRED EMBODIMENTS

First Embodiment

Figure 1:
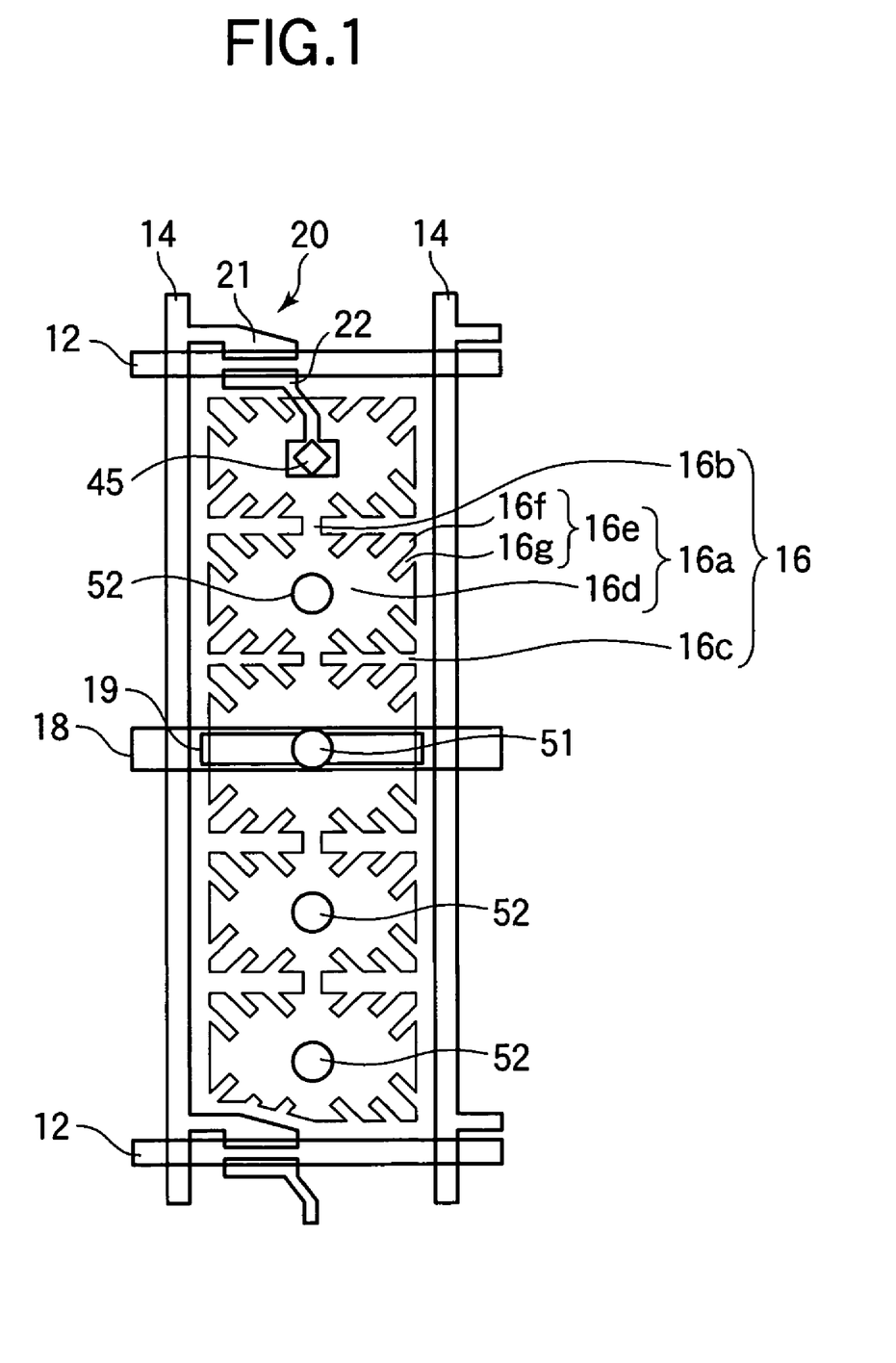
FIG. 1 shows a configuration of a liquid crystal display according to a first embodiment of the invention.
Figure 2:
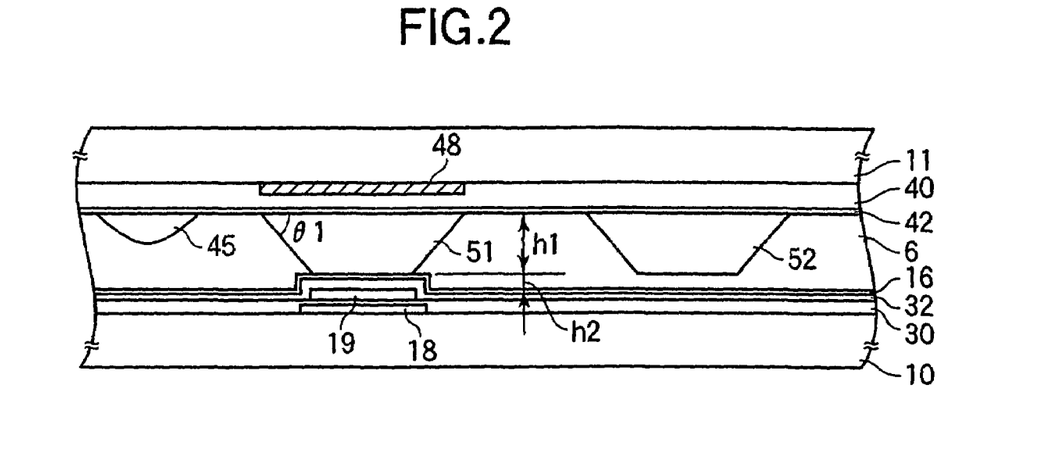
FIG. 2 shows a schematic sectional configuration of the liquid crystal display according to the first embodiment of the invention.

A liquid crystal display according to a first embodiment of the invention will now be described with reference to FIGS. 1 to 6. FIG. 1 shows a configuration of one pixel of the liquid crystal display according to the present embodiment. FIG. 2 shows a schematic sectional configuration of the liquid crystal display according to the present embodiment. As shown in FIGS. 1 and 2, the liquid crystal display has a TFT substrate 2 and an opposite substrate 4 provided opposite to each other and a liquid crystal 6 sealed between the substrates 2 and 4. The liquid crystal 6 is aligned substantially perpendicularly to the surfaces of the substrates, and it has negative dielectric constant anisotropy. The liquid crystal display is fabricated through steps of printing and baking alignment films (vertical alignment films) on surfaces of the substrates 2 and 4 opposite to each other, applying a sealing material to a peripheral section of either of the substrates 2 and 4, attaching the substrates 2 and 4 after dropping the liquid crystal 6, cutting and chamfering the substrates thereafter, applying polarizers, and so on.

The TFT substrate 2 has a plurality of gate bus lines 12 extending in the horizontal direction in FIG. 1 provided on a transparent glass substrate 10. For example, the gate bus lines 12 are formed by stacking layers of aluminum (Al), neodymium (Nd), and molybdenum (Mo) in the order listed to form a metal film having a thickness of 250 nm on the glass substrate 10 and patterning the film into a predetermined configuration using a photolithographic process. An insulation film 30 constituted by a silicon nitride film (SiN film) having a thickness of, for example, 350 nm is formed on the gate bus lines 12. A plurality of drain bus lines 14 extending in the vertical direction in FIG. 1 are formed such that they intersect the gate bus lines 12 with the insulation film 30 interposed between them. For example, the drain bus lines 14 are constituted by a metal film having a thickness of 320 nm provided by stacking layers of Mo, Al and Mo in the order listed. An insulation film 32 constituted by a SiN film having a thickness of, for example, 200 nm is formed on the drain bus lines 14.

A TFT 20 is formed in the vicinity of each of intersections between the gate bus lines 12 and the drain bus lines 14. A drain electrode 21 of a TFT 20 is formed of the same material as that of the drain bus lines 14 and is electrically connected to a drain bus line 14. A source electrode 22 is provided opposite to the drain electrode 21. A part of a gate bus line 12 serves as a gate electrode of a TFT 20. An active semiconductor layer of a TFT 20 is formed of amorphous silicon (a-Si), for example.

In pixel regions on the insulation film 32 surrounded by the gate bus lines 12 and drain bus lines 14, pixel electrodes 16 are formed by patterning an ITO film having a thickness of, for example, 40 nm. A pixel electrode 16 is electrically connected to the source electrode 22 of a TFT 20 through a contact hole which is not shown. A pixel electrode 16 has five electrode units 16a successively arranged in the extending direction of the drain bus lines 14, slits 16c formed between adjoining electrode units 16a and connection electrodes 16b for electrically connecting the electrode units 16a which are separated by the slits 16c. An electrode unit 16a has a solid portion 16d provided in the middle thereof and a comb-tooth-shaped portion 16e provided at the periphery of the solid portion 16d. A comb-tooth-shaped portion 16e has a plurality of linear electrodes 16f extending from the solid portion 16d and spaces 16g formed between adjoining linear electrodes 16f. The linear electrodes 16f extend in four different directions in respective regions. Linear electrodes 16f at a top right part of an electrode unit 16a extend to the right and upward, and linear electrodes 16f at a bottom right part of the electrode unit 16a extend to the right and downward. Linear electrodes 16f at a top left part of the electrode unit 16a extend to the left and upward, and linear electrodes 16f at a bottom left part of the electrode unit 16a extend to the left and downward. Liquid crystal molecules are tilted in parallel with the extending directions of the linear electrodes 16f and toward the solid portion 16d. Thus, the alignment of liquid crystal 6 is divided into four directions at each electrode unit 16a.

Storage capacitor bus lines 18 extending in parallel with the gate bus lines 12 are formed such that they traverse respective pixel regions substantially in the middle thereof. The storage capacitor bus lines 18 are formed of the same material as that of the gate bus lines 12. A storage capacitor electrode 19 is formed in each pixel region above the storage capacitor bus line 18 with the insulation film 30 interposed between them. The storage capacitor electrode 19 is formed of the same material as that of the drain bus line 14. A storage capacitor electrode 19 is electrically connected to a pixel electrode 16 through a contact hole which is not shown.

The opposite substrate 4 has a black matrix (BM) 48 (not shown in FIG. 1) provided on a glass substrate 11 for shielding light-shield regions between adjoining pixel regions and regions (light-shield portions) above the storage capacitor bus lines 18 (storage capacitor electrodes 19) in the pixel regions. For example, the BM 48 is formed by patterning a low-reflection chromium (Cr) film having a thickness of 160 nm or a black resin film having a thickness of 1.2 μm. A CF resin layer 40 in any of red (R), green (G) and blue (B) is formed in a pixel region on the glass substrate 11. The CF resin layers 40 are formed by repeating a process of applying and patterning a colored resin having a thickness of, for example, 1.8 μm for each of the colors R, G and B or three times in total. A common electrode 42 constituted by an ITO film having a thickness of, for example, 150 nm is formed throughout the substrate over the CF resin layers 40.

Figure 3:
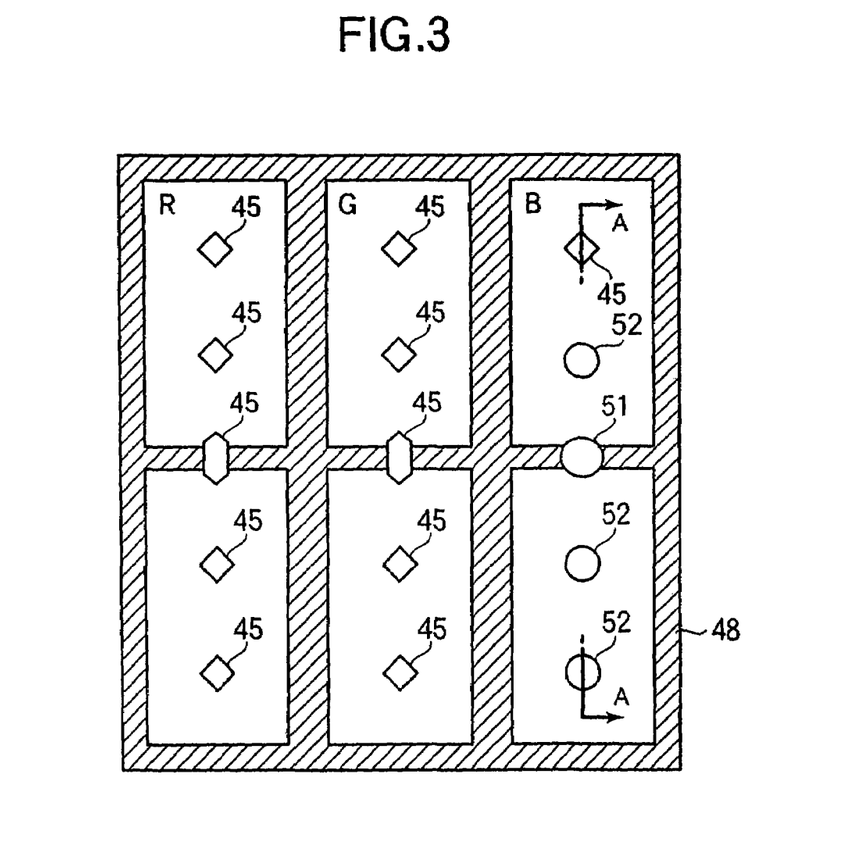
FIG. 3 shows disposition of point-like protrusions and protrusion-like structures on an opposite substrate of the liquid crystal display according to the first embodiment of the invention.
Figure 4:
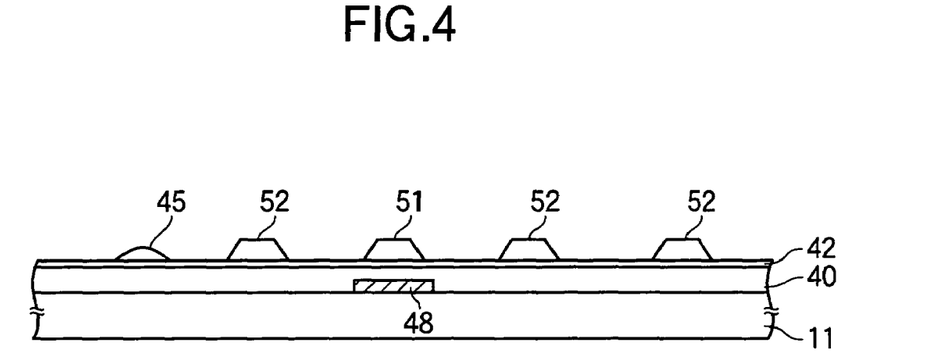
FIG. 4 shows a sectional configuration of the opposite substrate of the liquid crystal display according to the first embodiment of the invention.
Figure 5A:
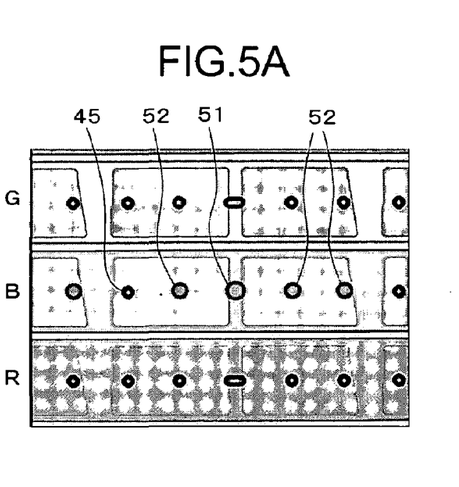
FIGS. 5A to 5F show a configuration of the opposite substrate of the liquid crystal display according to the first embodiment of the invention.
Figure 5B:
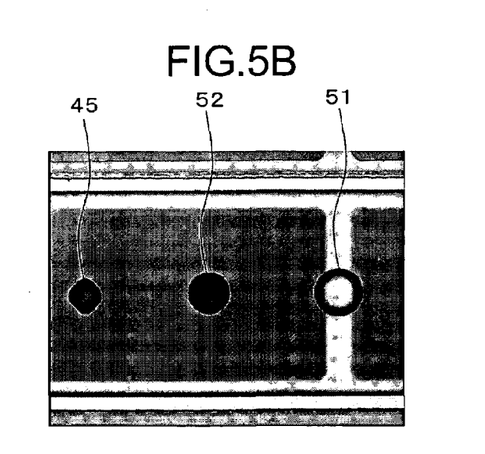
Figure 5C:
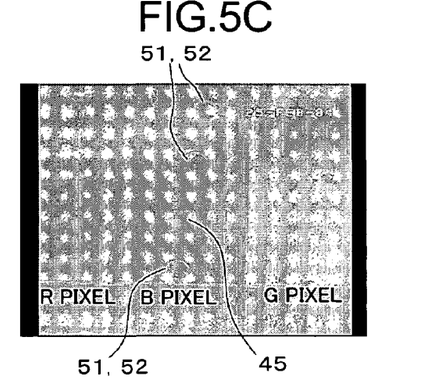
Figure 5D:
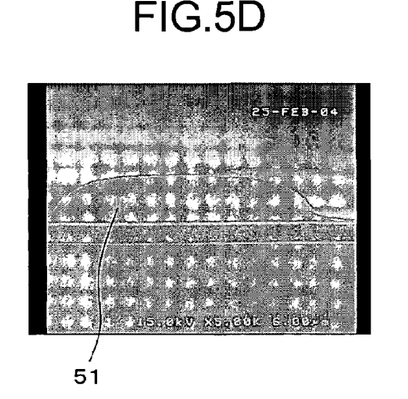
Figure 5E:
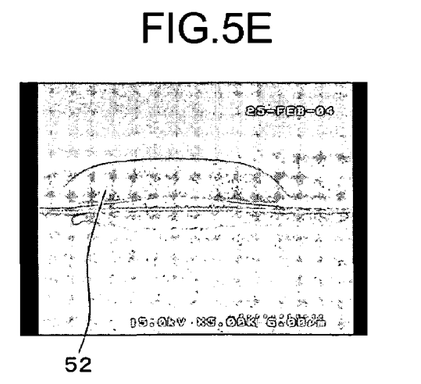
Figure 5F:
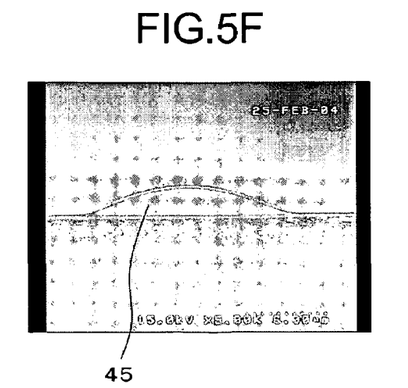

Point-like protrusions (alignment regulating protrusions) 45 made of a dielectric material and protrusion-like structures 51 and 52 are formed on the common electrode 42 as alignment regulating structures for regulating the alignment of the liquid crystal 6. FIG. 3 shows dispositions of point-like protrusions 45 and protrusion-like structures 51 and 52 in three pixels in R, G and B, respectively, and FIG. 4 shows a sectional configuration of the opposite substrate 4 taken along the line A-A in FIG. 3. FIG. 5A shows dispositions and configurations of point-like protrusions 45 and protrusion-like structures 51 and 52 in substantially three pixels. FIG. 5B is an enlarged view of the neighborhood of a point-like protrusion 45 and protrusion-like structures 51 and 52. FIG. 5C shows the configuration of the opposite substrate 4 as viewed in an oblique direction. FIG. 5D shows a sectional configuration of the opposite substrate 4 taken in the vicinity of a protrusion-like structure 51. FIG. 5E shows a sectional configuration of the opposite substrate 4 taken in the vicinity of a protrusion-like structure 52. FIG. 5F shows a sectional configuration of the opposite substrate 4 taken in the vicinity of a point-like protrusion 45.

As shown in FIGS. 3 to 5F, in each of the pixels on the opposite substrate 4, five alignment regulating structures (point-like protrusions 45 and protrusion-like structures 51 and 52) are provided in total, the structures being arranged linearly. Each of the alignment regulating structures is formed in a position which substantially corresponds to the center of an electrode unit 16a on the TFT substrate 2. In the R and G pixels, one point-like protrusion 45 is provided such that overlaps the light-shield portion shielding the storage capacitor bus line 18 from light, and two point-like protrusions 45 are provided at each of upper and lower apertures in FIG. 3. On the contrary, in the B pixel, one protrusion-like structure 51, three protrusion-like structures 52 and one point-like protrusion 45 are provided. The protrusion-like structure 51 is provided such that it overlaps the light-shield portion shielding the storage capacitor bus line 18 from light. Two protrusion-like structures 52 are provided at the upper aperture in FIG. 3. The other protrusion-like structure 52 and the one point-like protrusion 45 are provided at the lower aperture in FIG. 3.

The point-like protrusions 45 are formed by applying a positive photosensitive resist to the common electrode 42 and performing pre-baking, exposing, developing, post-baking steps on the same such that they will have an ultimate height of, for example, about 2.5 μm above the surface of the common electrode 42. The point-like protrusions 45 have a plan configuration, for example, in the form of a square of 14 μm×14 μm, and they are disposed such that each side of the same will be oblique to an edge of a pixel region. The protrusion-like structures 51 and 52 are formed by applying a negative photosensitive resist to the common electrode 42 and performing pre-baking, exposing, developing, and post-baking steps on the same. The protrusion-like structures 51 and 52 are formed such that they will have an ultimate height h1 of, for example, about 4.0 μm above the surface of the common electrode 42.

A protrusion-like structure 51 is provided in a position associated with a storage capacitor bus line 18 and a storage capacitor electrode 19 on the TFT substrate 2, and a protrusion-like structure 52 is provided at an aperture of the pixel (see FIG. 2). The height of a region of the TFT substrate 2 where a storage capacitor bus line 18 and a storage capacitor electrode 19 are formed above the glass substrate 10 is greater than that of a pixel aperture region by a height h2 which is equivalent to the thickness of the metal layers (about 0.5 to 0.6 μm). Therefore, although the protrusion-like structures 51 and 52 are formed with substantially the same height h1, the protrusion-like structure 51 contacts the TFT substrate 2 whereas the protrusion-like structure 52 does not contact the TFT substrate 2 when the substrates 2 and 4 are attached. Thus, the protrusion-like structures 51 maintain a first cell thickness (≅h1+h2), and the protrusion-like structures 52 maintain a second cell thickness (≅h1) smaller than the first cell thickness when a pressure is applied from the outside. For example, when a heavy load is locally applied to a surface of the panel, the protrusion-like structures 51 are deformed, and the protrusion-like structures 52 come into contact with the TFT substrate 2 before a limit for breakdown of the protrusion-like structures 51 is reached. Since the protrusion-like structures 52 are provided in a high disposition density to support the load by distributing the same, any further change in the cell thickness will not occur. It is therefore possible to prevent the occurrence of cell thickness variation attributable to elastic breakdown of pillar spacers.

The protrusion-like structures 51 are designed with a low disposition density (e.g., one structure per 18 pixels) based on the characteristics of compressive displacement of acrylic resins such that predetermined displacement will be achieved when they are loaded at the time of manufacture of a panel. The protrusion-like structures 52 are designed with a high disposition density (e.g., three structures per B pixel (or 18 structures per 18 pixels)) such that they can withstand a very heavy localized load such as that applied when a panel is depressed with a finger.

Although the protrusion-like structures 51 and 52 serve as alignment regulating structures, they may leave slight abnormalities in the alignment of the liquid crystal 6 when compared to the point-like protrusions 45. It is therefore desirable to form them in pixels of blue which is lowest in transmittance among the three colors R, G and B. When the protrusion-like structures 51 and 52 are formed only in B pixels, display defects attributable to abnormalities of the alignment of the liquid crystal 6 are less visually perceptible compared to those encountered when the protrusion-like structures 51 and 52 are formed also in R and G pixels. When an angle (taper angle) θ1 defined by side sections of the protrusion-like structures 51 and 52 and the surface of the opposite substrate 4 is made equal to or smaller than 45° by controlling exposing conditions, developing conditions and baking conditions, the possibility of abnormalities in the alignment of the liquid crystal 6 will be lower than that in a case wherein the taper angle θ1 is greater than 45°. For example, the protrusion-like structures 51 and 52 have a bottom surface (facing the opposite substrate 4) in the form of a circle having a diameter of about 20 μm and a top surface (facing the TFT substrate 2) having a diameter of about 9 μm. The diameter of the bottom surfaces of the protrusion-like structures 51 and 52 are equal to or smaller than about one-third of the width of an aperture (e.g., 78 μm). Any reduction in the aperture ratio of a pixel can be prevented by keeping the area occupied by a protrusion-like structure 52 (or 51) provided at the aperture of the pixel equal to or smaller than about 10% of the area of the aperture.

According to the present embodiment, since the protrusion-like structures 51 and 52 serving as pillar spacers can be provided also in the apertures of pixels, limitations on positions for disposal of the structures are relaxed, and the protrusion-like structures 51 and 52 which substantially have different heights can be provided in respective desired disposition densities. The disposition of either of the protrusion-like structures 51 and 52 will not affect the disposition of the other. Since this allows an improvement in the characteristics of compressive displacement of the pillar spacers such as elasticity and restorability in response to a change in a cell thickness, a wide margin of the amount of liquid crystal dispensed and high anti-pressure characteristics can be achieved even in a liquid crystal display having a high aperture ratio fabricated using the ODF method. It is therefore possible to provide liquid crystal displays having stable quality with a high yield of manufacture.

Figure 6:
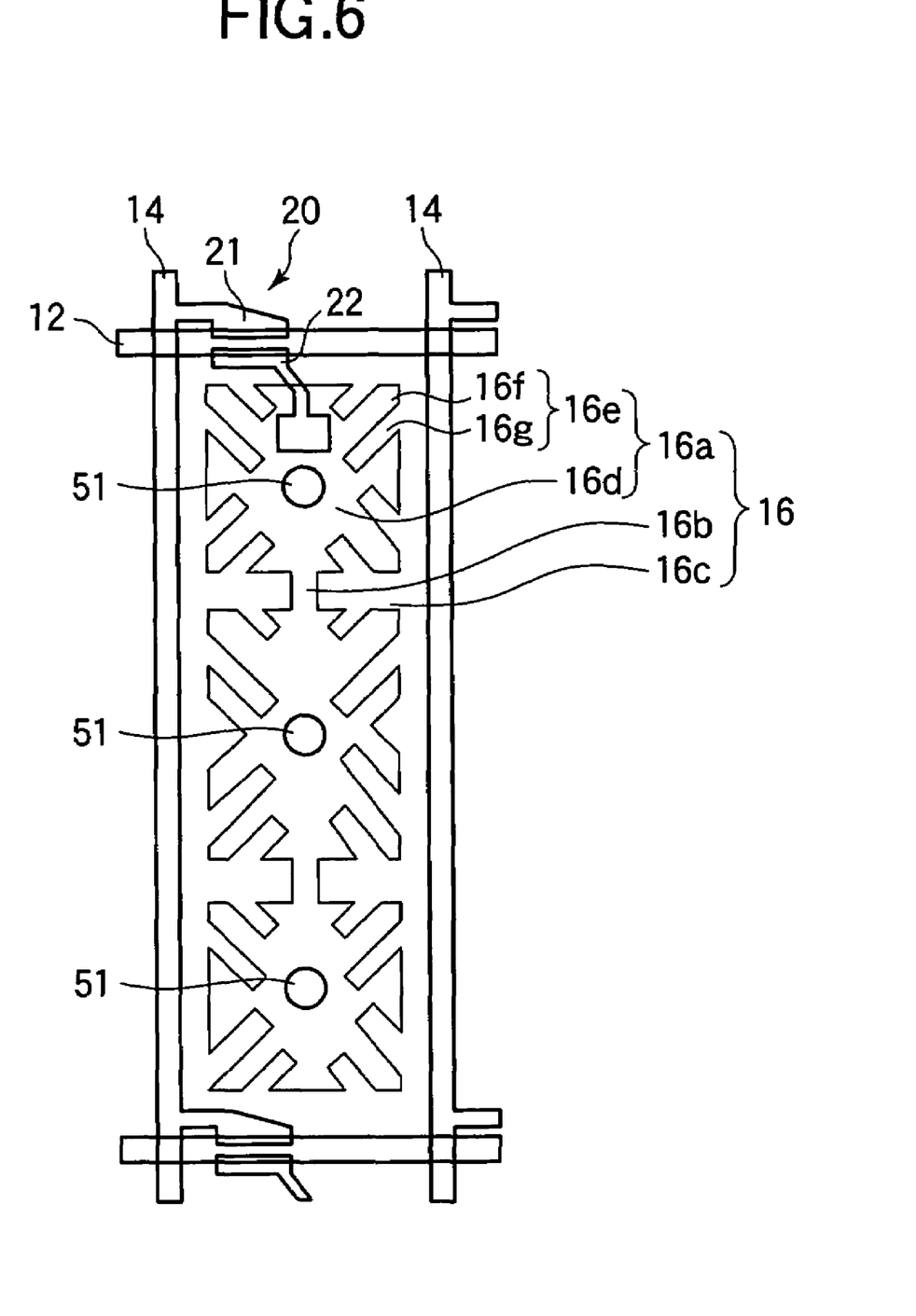
FIG. 6 shows a modification of the configuration of the liquid crystal display according to the first embodiment of the invention.

FIG. 6 shows a modification of the configuration of a liquid crystal display according to the present embodiment. As shown in FIG. 6, a pixel electrode 16 in the present modification has three electrode units 16a. A protrusion-like structure 51 is formed on an opposite substrate 4 in each of positions substantially corresponding to the centers of the three electrode units 16a. Any of the three protrusion-like structures 51 contacts a TFT substrate 2 to maintain a predetermined cell thickness. Thus, only protrusion-like structures 51 having substantially the same height may be formed in a desired disposition density.

According to the present modification, since the protrusion-like structures 51 serving as pillar spacers can be provided also in apertures of pixels, limitations on positions for disposal of the structures are relaxed, and the structures can be provided in a desired disposition density. It is therefore possible to achieve high anti-pressure characteristics even in a liquid crystal display having a high aperture ratio.

While the protrusion-like structures 51 and 52 are formed on the CF substrate 4 using an acrylic resin in the present embodiment, the protrusion-like structures 51 and 52 may alternatively be formed on the TFT substrate 2. The protrusion-like structures 51 and 52 may be formed by stacking parts of the CF resin layers 40 one over another instead of forming the protrusion-like structures 51 and 52 at an independent step.

Second Embodiment

Figure 7:
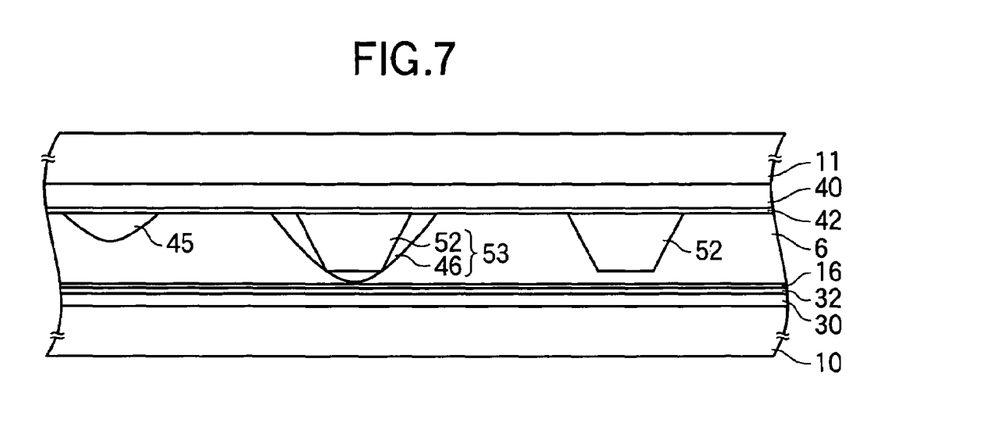
FIG. 7 shows a sectional configuration of a liquid crystal display according to a second embodiment of the invention.

A liquid crystal display according to a second embodiment of the invention will now be described with reference to FIG. 7. FIG. 7 shows a sectional configuration of the liquid crystal display according to the present embodiment. As shown in FIG. 7, in the present embodiment, protrusion-like structures 52 and 53 having different heights above a substrate surface are formed on an opposite substrate 4 instead of taking advantage of a difference in the height of a TFT substrate 2. Point-like protrusions 45 are formed after the formation of the protrusion-like structures 52, and some of the protrusion-like structures 52 are covered by a resin layer 46 which is formed simultaneously with the point-like protrusions 45 using the same material. A protrusion-like structure 53 greater in height than a protrusion-like structure 52 is formed by the resin layer 46 and a protrusion-like structure 52 which is covered by the resin layer 46. Thus, there is provided protrusion-like structures 52 which are formed of an acrylic resin and protrusion-like structures 53 which are greater in height than the protrusion-like structures 52, surface sections of the structures 53 being formed of the same material as that of the point-like protrusions 45, the remaining sections of the protrusions 53 being formed of the same material as that of the protrusion-like structures 52. The difference in height between the protrusion-like structures 52 and 53 is in the range from about 0.3 μm to about 0.7 μm.

According to the present embodiment, since the protrusion-like structures 52 and 53 having different heights can be provided in respective desired disposition densities, a wide margin of the amount of liquid crystal dispensed and high anti-pressure characteristics can be achieved even in a liquid crystal display having a high aperture ratio fabricated using the ODF method. It is therefore possible to provide liquid crystal displays having stable quality with a high yield of manufacture.

Third Embodiment

Figure 8:
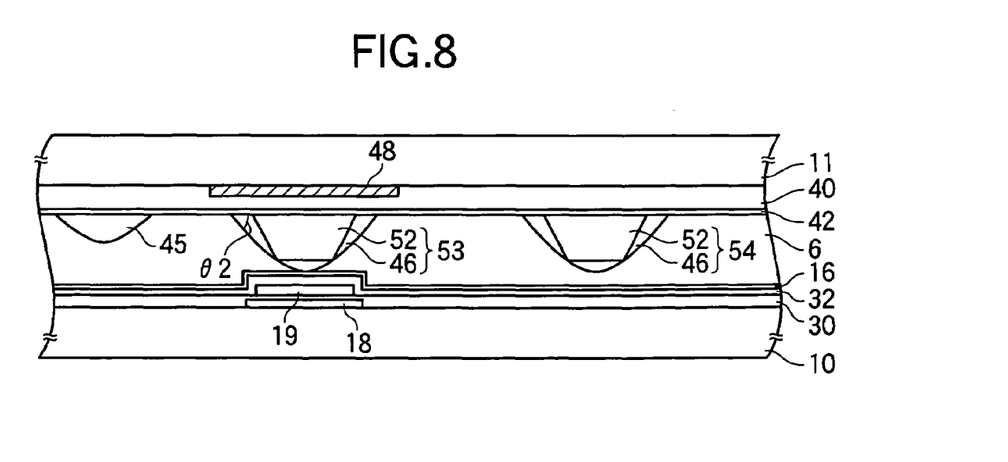
FIG. 8 shows a sectional configuration of a liquid crystal display according to a third embodiment of the invention.

A liquid crystal display according to a third embodiment of the invention will now be described with reference to FIG. 8. FIG. 8 shows a sectional configuration of the liquid crystal display according to the present embodiment. As shown in FIG. 8, in the present embodiment, all protrusion-like structures 52 are covered by a resin layer 46 which is formed simultaneously with point-like protrusions 45 using the same material. Protrusion-like structures 53 and 54 which are substantially different in height are formed by the resin layer 46 and the protrusion-like structures 52 which is covered by the resin layer 46 in the same manner as that in the first embodiment.

According to the present embodiment, since a taper angle θ2 of side sections of the protrusion-like structures 53 and 54 is smaller than the taper angle θ1 shown in FIG. 2, a further reduction of abnormalities in the alignment of a liquid crystal 6 can be achieved in comparison to the first embodiment, and display defects will be less visually perceptible.

The invention is not limited to the above-described embodiments and may be modified in various ways.

For example, although transmissive liquid crystal displays have been referred to in the above-described embodiments by way of example, the invention is not limited to them and may be applied to other types of liquid crystal displays such as reflective and transflective types.

Although liquid crystal displays having CF resin layers 40 formed on an opposite substrate 4 have been referred to in the above-described embodiments by way of example, the invention is not limited to them and may be applied to liquid crystal displays having the so-called CF-on-TFT structure in which CF resin layers 40 are formed on a TFT substrate 2.

What is claimed is:
1. A liquid crystal display comprising:
a pair of substrates provided opposite to each other;
a liquid crystal sealed between the pair of substrates;
a plurality of pixel regions provided on the substrates; and
protrusion-like structures provided in the pixel regions to both regulate the alignment of the liquid crystal and to maintain a cell thickness between the pair of substrates,
wherein at least one of the protrusion-like structures is provided at an aperture of the pixel regions, has a first end formed on one of the substrates, and a second end continuously in contact with the other substrate,
wherein some of the protrusion-like structures contact both of the pair of substrates to maintain a first cell thickness, and the other protrusion-like structures contact both of the pair of substrates to maintain a second cell thickness smaller than the first cell thickness when a pressure is applied thereto from outside.

2. A liquid crystal display according to claim 1, wherein the area occupied by the protrusion-like structure provided at the aperture is equal to or smaller than 10 % of the area of the aperture.

3. A liquid crystal display according to claim 1, wherein the plurality of the protrusion-like structures are provided in at least one of the pixel regions.

4. A liquid crystal display according to claim 1, wherein the protrusion-like structures have a side section at a taper angle of 45° or less.

5. A liquid crystal display according to claim 1, further comprising alignment regulating protrusions for regulating the alignment of the liquid crystal, which are formed in the pixel regions with a height smaller than that of the protrusion-like structures, wherein a part of at least some of the protrusion-like structures is formed of the same material as that of the alignment regulating protrusions.

6. A liquid crystal display according to claim 5, wherein surface sections of at least some of the protrusion-like structures are formed of the same material as that of the alignment regulating protrusions.

7. A liquid crystal display according to claim 5, wherein the alignment regulating protrusions are formed of a positive resist.

8. A liquid crystal display according to claim 1, wherein at least a part of the protrusion-like structures is formed of a negative resist.

9. A liquid crystal display according to claim 1, comprising a plurality of electrode units, a connection electrode for electrically connecting the electrode units, and a pixel electrode provided in each of the pixel regions, wherein the protrusion-like structures are provided in positions substantially corresponding to the centers of the electrode units.

10. A liquid crystal display according to claim 1, wherein the liquid crystal is aligned substantially perpendicularly to the surfaces of the substrates and has negative dielectric constant anisotropy.

11. A liquid crystal display according to claim 1, wherein the protrusion-like structures are provided only in a pixel region having a color filter layer in blue.

* * * * *